United States Patent

Thayer

Patent Number: 6,084,601
Date of Patent: Jul. 4, 2000

[54] CORNER BUFFER SYSTEM FOR IMPROVED MEMORY READ EFFICIENCY DURING TEXTURE MAPPING

[75] Inventor: Larry J. Thayer, Fort Collins, Colo.

[73] Assignee: Hewlett Packard Company, Palo Alto, Calif.

[21] Appl. No.: 09/070,691

[22] Filed: Apr. 30, 1998

[51] Int. Cl.[7] ..................................................... G09G 5/36
[52] U.S. Cl. .......................... 345/515; 345/430; 345/509; 345/521
[58] Field of Search ..................................... 345/430, 515, 345/516, 513, 425, 521, 507–509

[56] References Cited

U.S. PATENT DOCUMENTS 5,886,706  3/1999  Alcorn et al. ............................ 345/430

*Primary Examiner*—Kee M. Tung
*Attorney, Agent, or Firm*—Kevin M. Hart

[57] ABSTRACT

A corner buffer system for improving memory read efficiency during the process of determining a bilinearly interpolated texel value corresponding to a pixel. The corner buffer system includes a conditional texel quad transposer, a conditional s,t fraction complementer and a corner buffer unit. Addresses for data words corresponding to each texel in a texel quad are received, as well as the two LSBs of the s,t coordinates for at least one of the four texels in the quad. The conditional texel quad transposer routes the texel addresses to first, second, third and fourth outputs according to the values of the LSBs of the s,t coordinates of each texel. The conditional s,t fraction complementer receives the fractional parts of the s,t coordinates of the pixel and conditionally complements them responsive to the state of the LSBs of the s,t coordinates of one of the four texels. The corner buffer unit has four address inputs and includes four sets of address storage registers and data storage registers. Each address input and register set is associated with a corner of the texel quad. At each corner, the address storage register is associated with a corresponding data storage register. Comparators determine, for each corner, whether the address presented at the address input is equal to the address stored for that corner. If they are not equal, texel data corresponding to the non-matching input address is retrieved and stored in the data storage register for that corner.

4 Claims, 6 Drawing Sheets

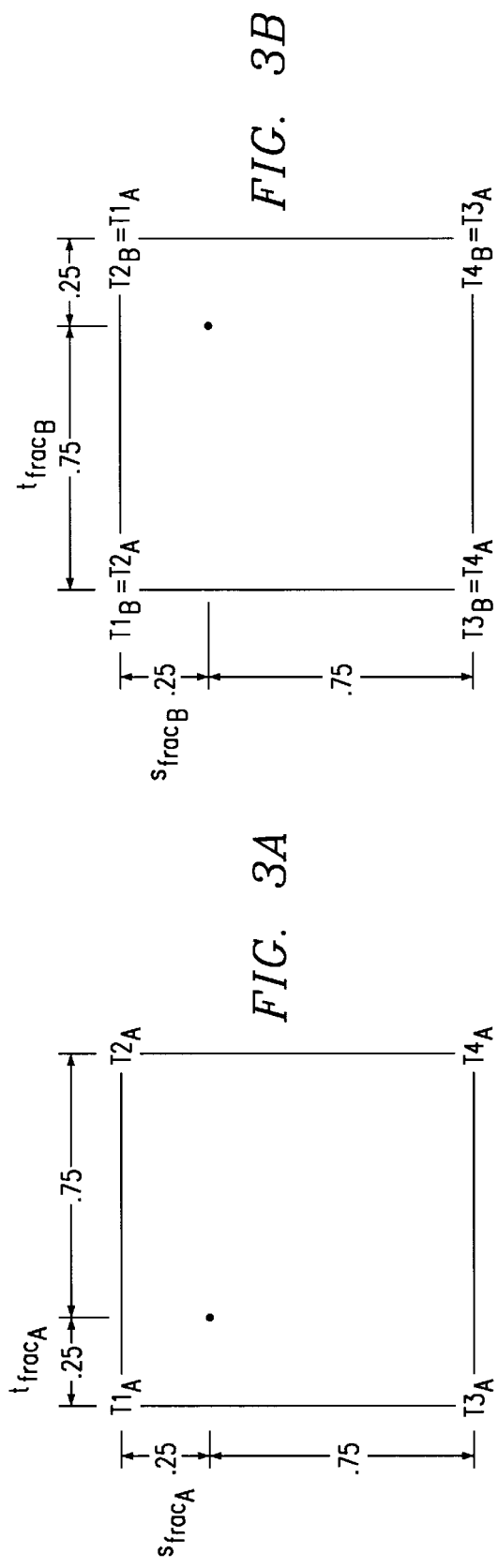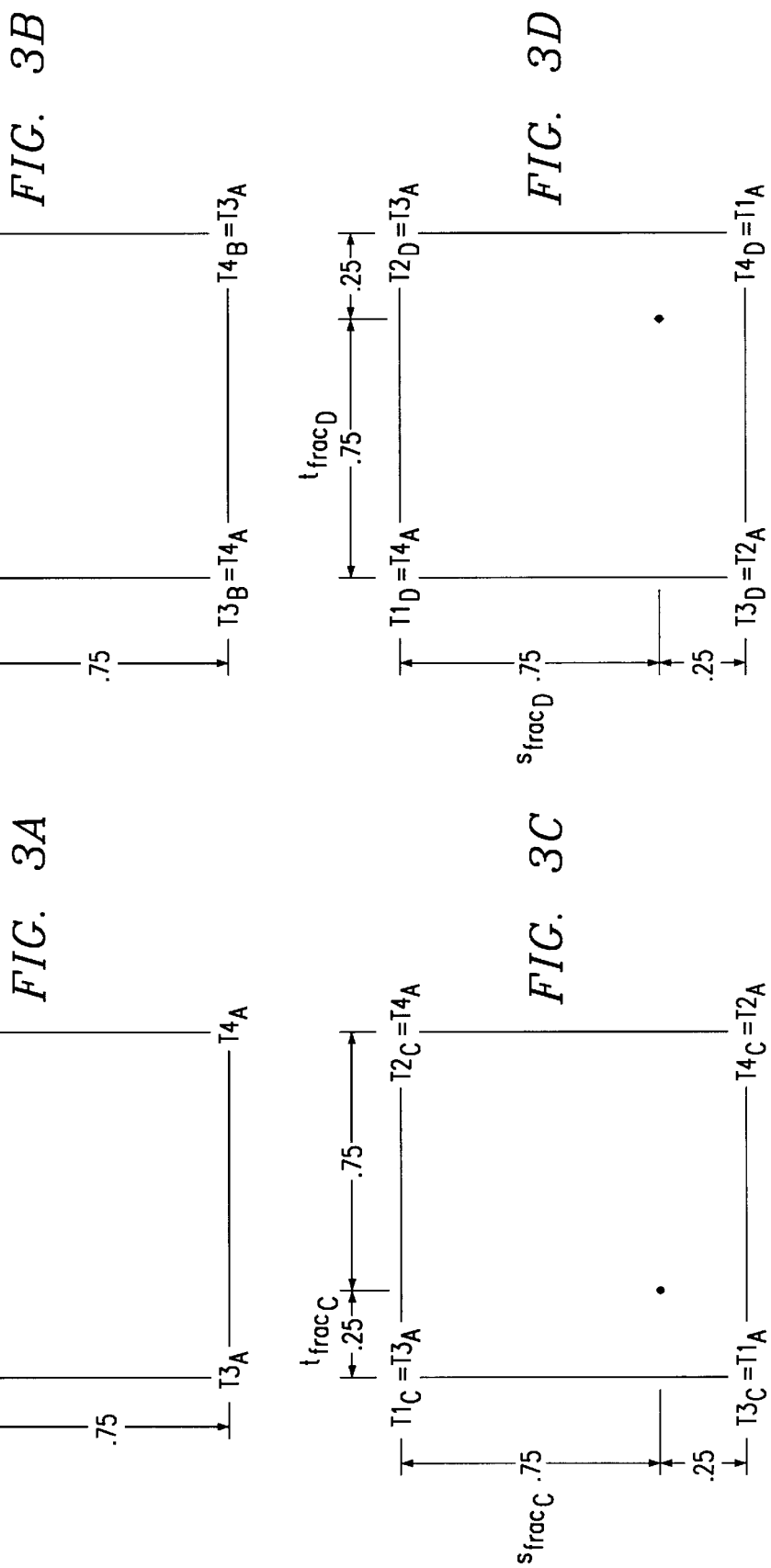

6,084,601

CORNER BUFFER SYSTEM FOR IMPROVED MEMORY READ EFFICIENCY DURING TEXTURE MAPPING

FIELD OF THE INVENTION

This invention relates to methods and apparatus for improving memory read performance in the context of texture mapping in computer graphics systems.

BACKGROUND

In the field of computer graphics, texture mapping is a known technique used to create the appearance of complexity on the surface of rendered objects without actually having to model every detail of the object's surface. Typically, the technique involves mapping a two-dimensional function or array (the texture) onto an object in three-dimensional object space and then projecting the resultant image back to two-dimensional screen space for display. For purposes of this discussion, texture space will be denoted (s,t) and screen space will be denoted (x,y).

The phrase "texture map" refers to the function or array that is used in the texture mapping process. A common two-dimensional texture map might consist of a repeatable pattern for representing a material, such as wood or marble for example. Such a texture map is made up of a plurality of numerical values called "texels." Each texel in the texture map has its own unique s,t coordinates within the texture map array. A texel's numerical value usually corresponds to an RGB color value and perhaps also to an alpha value. Often, the correspondence between numerical texel values and RGB/alpha values is determined with a look-up table. On the other hand, the RGB/alpha values may also be independent bit fields in a multi-bit texel value. For example, in a system that uses 32-bits for each texel value, 8 bits each may be allocated in each texel value for the R, G, B and alpha components. But in systems that use only 8 bits for each texel value, it may be preferable to use the 8 bits as an index to a look-up table where the R, G, B and alpha values are stored. The texture maps themselves are usually stored either in frame buffer memory or in system memory, or both.

The s and t coordinates for each texel in an actual texture map are whole numbers. Likewise, the x and y coordinates for each physical pixel in screen space are whole numbers. But the abstract process of mapping the x,y coordinates for a given pixel to the s,t coordinates of a texture map yields target s,t coordinates that each have an integer portion and a fractional portion. This is so because, in general, the mapped s,t coordinates corresponding to a pixel usually will not coincide perfectly with the location of one of the texels in the texture map. Rather, the mapped s,t coordinates for a pixel will usually lie somewhere in a square region defined by four adjacent texels.

For purposes of this discussion, any four adjacent texels that define such a region in a texture map will be referred to as a "texel quad," and the location of the texels defining the texel quad will be referred to as the "corners" of the texel quad. More specifically, the "upper left corner" of a texel quad will refer to the nearest texel in the pertinent texture map whose s coordinate is less than or equal to the s coordinate of the pixel and whose t coordinate is less than or equal to the t coordinate of the pixel. The "upper right corner" of a texel quad will refer to the nearest texel in the pertinent texture map whose s coordinate is less than or equal to the s coordinate of the pixel and whose t coordinate is greater than or equal to the t coordinate of the pixel. The "lower left corner" of a texel quad will refer to the nearest texel in the pertinent texture map whose s coordinate is greater than or equal to the s coordinate of the pixel and whose t coordinate is less than or equal to the t coordinate of the pixel. The "upper right corner" of a texel quad will refer to the nearest texel in the pertinent texture map whose s coordinate is greater than or equal to the s coordinate of the pixel and whose t coordinate is greater than or equal to the t coordinate of the pixel.

By way of further explanation, the phrase "texel address" as used in this discussion will refer not just to the specific address for a particular texel value, but to the address of the multi-bit data word that contains a particular texel value. For example, in a system that uses 8 bits per texel, a 32-bit data word could include four different texel values; thus, the address for a 32-bit data word could correspond to four different texel values.

Once the integer and fractional parts of the s,t coordinates are determined for a given pixel, the texels that make up the texel quad surrounding the mapped s,t coordinates are interpolated to produce a final texel value for the pixel. This process is called "bilinear interpolation." By way of explaining bilinear interpolation, assume an arbitrary texel quad 100 as shown in FIG. 1 whose corner coordinates and texel values are as follows:

TABLE 1

| Texel | s Coordinate | t Coordinate | Texel Value |
|---|---|---|---|
| 102 (T1, upper left) | 5 | 8 | 20 |
| 104 (T2, upper right) | 5 | 9 | 25 |
| 106 (T3, lower left) | 6 | 8 | 30 |
| 108 (T4, lower right) | 6 | 9 | 35 |

Also assume an arbitrary pixel 110 whose x,t coordinates map to the following s,t coordinates: s=5.25, t=6.25. The process of bilinear interpolation goes as follows: First, the values of texels 102 and 104 are linearly interpolated to determine a value for point 112, and the values of texels 106 and 108 are linearly interpolated to determine a value for point 114. Then, the values of points 112 and 114 are linearly interpolated to determine the value for pixel 110. In this example, the value for point 112 would be 21.25, the value for point 114 would be 31.25, and the value for the pixel would be 23.75. Note that only the integer part of the pixel's s,t coordinates are needed to locate which texel quad will be used as a basis for the interpolation, and only the fractional part of the pixel's s,t coordinates are needed to actually perform the interpolation.

From the above example, it can be seen that bilinear interpolation in texture mapping requires four texel values for each pixel. Moreover, in texture mapping systems that utilize a multum in parvo scheme (i.e., "MIP mapping"), trilinear interpolation is often performed, requiring eight texel values for each pixel. Because each texel is stored in a texture map somewhere either in frame buffer memory or system memory, and because of the time required to read from those memories, it is important to access required texel values in an efficient manner.

One possible solution to the memory access efficiency problem is to dedicate a traditional cache memory system to the task. But traditional cache memory systems are expensive to implement—not only because of the cost of high speed RAM, but also because of the overhead associated with the relatively large and complex circuitry and algorithms required to control traditional cache systems. In short, a traditional cache memory solution cannot easily be cost justified for solving such a special-case problem in such a special-purpose computer subsystem.

Therefore, a need exists for a relatively inexpensive memory arrangement that will improve read efficiency in the context of performing bilinear interpolation during texture mapping.

SUMMARY OF THE INVENTION

The invention includes numerous aspects, each of which contributes to improving memory read efficiency during the process of determining a bilinearly interpolated texel value corresponding to a pixel.

In one aspect, the invention includes a conditional texel quad transposer. Four texels are selected corresponding to the upper left, upper right, lower left and lower right texels of a texel quad to which the pixel maps. The addresses for the data words corresponding to each texel in the texel quad are received at texel address inputs, and the two LSBs of the s,t coordinates for at least one of the four texels are received at first s,t inputs. The conditional texel quad transposer routes the texel addresses to first, second, third and fourth outputs in the following manner: The texel address appearing at the first output corresponds to the texel for which the LSBs of the s and t coordinates are 0 and 0, respectively. The texel address appearing at the second output corresponds to the texel for which the LSBs of the s and t coordinates are 0 and 1, respectively. The texel address appearing at the third output corresponds to the texel for which the LSBs of the s and t coordinates are 1 and 0, respectively. And the texel address appearing at the fourth output corresponds to the texel for which the LSBs of the s and t coordinates are 1 and 1, respectively.

In another aspect, the invention includes a conditional s,t fraction complementer. The fractional part of the s coordinate of the pixel is received at as sfrac input. The fractional part of the t coordinate of the pixel is received at a tfrac input. And the two LSBs of the s,t coordinates for at least one of the four texels are received at second s,t inputs. The conditional s,t fraction complementer is operable to produce an sfrac' value at an sfrac' output and a tfrac' value at a tfrac' output responsive to the sfrac input, the tfrac input and the second s,t inputs. Depending on the state of the two bits presented to the second s,t inputs, the sfrac' value produced is equal either to sfrac or to an approximation to the quantity (1-sfrac), and the tfrac' value produced is either equal to tfrac or an approximation to the quantity (1-tfrac).

In another aspect, the invention includes a corner buffer unit. The corner buffer unit has address inputs for receiving four addresses and includes four sets of address storage registers and data storage registers. Each of the address inputs and register sets is associated with a corner of a texel quad. At each corner, the address storage register is associated with a corresponding data storage register. The corner buffer unit also contains comparators operable to determine, for each corner, whether the address presented at the address input is equal to the address stored register for that corner. If the corner buffer unit determines the addresses are equal, then it routes data from the associated data storage register to a corresponding one of four texel value outputs. For corners in which the input address is not equal to the stored address, the corner buffer unit is operable with a memory interface to retrieve data corresponding to the input address and to store the data into the data storage register for that corner. In further embodiments, more than one address/data register set may be associated with each corner. Indeed, a mini-cache system can be associated with each corner. In still further embodiments, the corner buffer unit contains additional comparators operable to determine whether any two or more of the input addresses are equal. In this manner, additional memory read efficiencies may be achieved for cases in which texel values for two or more corners of the texel quad share a common data word address. If data corresponding to the shared address is already resident in one corner of the corner buffer unit, it may be copied to another corner without the need for a memory access. If not, then additional efficiency will still have been achieved because at least one memory access will have been avoided: The required data word need be fetched from memory only once; it can then be copied into the appropriate corners of the corner buffer unit.

In another aspect, the address inputs of the conditional texel quad transposer are coupled to the outputs of a texel quad address generator. The integer parts of pixel s,t coordinates are fed to the address generator, and the fractional parts are fed to the conditional s,t fraction complementer. The outputs of the conditional texel quad transposer are coupled to the inputs of the corner buffer unit, which in turn is interfaced to system or frame buffer memory. Finally, the outputs of the corner buffer unit and the conditional s,t fraction complementer are coupled to corresponding inputs of a bilinear interpolation unit. The resultant arrangement is operable to yield memory read efficiencies in a cost-effective manner during the process of driving the bilinear inerpolation unit to produce texel values for the pixels, as will be described in more detail below.

BRIEF DESCRIPTION OF THE DRAWINGS

FIGS. 3A–D is a diagram illustrating a texel quad and a pixel in various states of transposition.

DETAILED DESCRIPTION OF THE PREFERRED EMBODIMENTS

Figure 2:
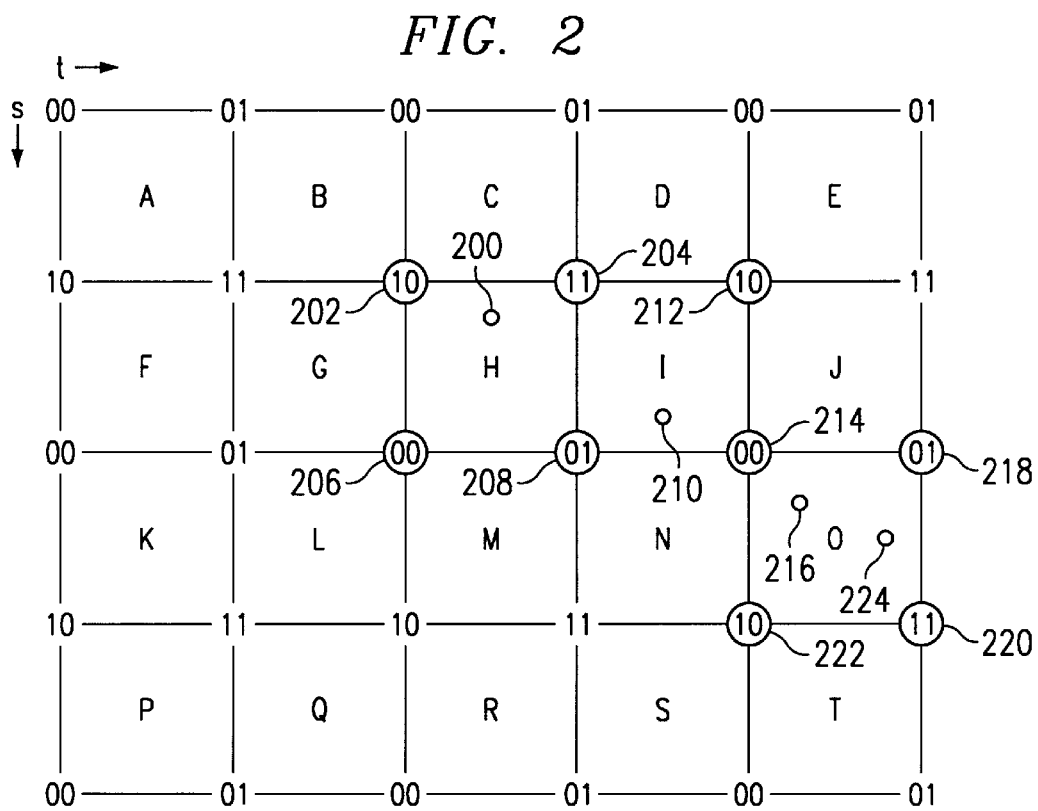
FIG. 2 is a diagram illustrating a portion of a texture map wherein the LSBs of the s,t coordinates for each texel are shown and wherein each texel quad is labeled with a reference letter.

Before discussing the structure and operation of the preferred embodiments of the invention in detail, it will be helpful first to make a few observations with reference to FIGS. 2 and 3.

FIG. 2 represents a portion of a texture map. The intersection of each row and column defines a particular s,t coordinate within the texture map at which a texel value would be stored. In the drawing, what is shown at each intersection point is not a texel value but rather the least significant bits of s and t corresponding to that particular intersection point. The LSB of the s coordinate is the left digit of each digit pair, and the LSB of the t coordinate is the right digit in each digit pair. For reference, the various texel quads are labeled with letters of the alphabet.

Observe that every texel quad has the following digit pairs at its corners, albeit not always in the same location: 00, 01, 10 and 11. In twenty-five percent of the texel quads (as in texel quad A), the 00 pair is in the upper left corner, the 01 pair is in the upper right corner, the 10 pair is in the lower left corner, and the 11 pair is in the lower right corner. In another twenty-five percent of the texel quads (as in texel quad B), the upper left and the upper right corners are transposed relative to texel quad A, and the lower left and lower right corners are transposed relative to texel quad A. In yet another twenty-five percent of the texel quads (as in texel quad F), the upper left and lower left corners are transposed relative to texel quad A, and the upper right and lower right corners are transposed relative to texel quad A. Finally, in the last twenty-five percent of the texel quads (as in texel quad G), all four corners are transposed relative to texel quad A.

Figure 1:
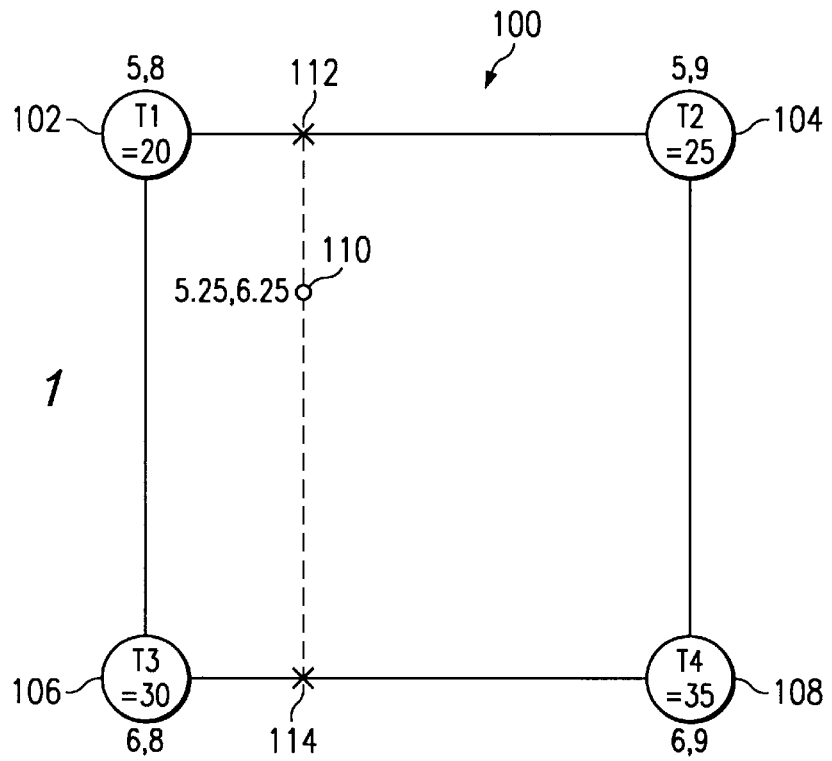
FIG. 1 is a diagram illustrating the process of bilinear interpolation within a texel quad.

FIG. 3A represents the same texel quad and pixel as was shown in FIG. 1. FIGS. 3B, 3C and 3D represent the same texel quad and pixel as in FIG. 3A, but in various states of transposition. Specifically, FIG. 3B represents the texel quad and pixel of FIG. 3A after transposing the entire assembly from left to right. FIG. 3C represents the texel quad and pixel of FIG. 3A after transposing the entire assembly from top to bottom. FIG. 3D represents the texel quad and pixel of FIG. 3A after transposing the entire assembly from left to right and from top to bottom. Observe that sfrac(B) is equal to sfrac(A), but tfrac(B) is equal to 1-tfrac(A). This is because, in FIG. 3B, the columns have been swapped relative to FIG. 3A but the rows remain the same. Similarly, observe that tfrac(C) is equal to tfrac(A), but sfrac(C) is equal to 1-sfrac(A). This is because, in FIG. 3C, the rows have been swapped relative to FIG. 3A but the columns remain the same. Referring now to FIG. 3D, we see that sfrac(D) is equal to 1-sfrac(A) and tfrac(D) is equal to 1-sfrac(D). This is because, in FIG. 3D, both the rows and the columns have been swapped relative to FIG. 3A.

Assume now that the values for T1(A), T2(A), T3(A) and T4(A) are the same as those given in Table 1. Finally, observe what happens during bilinear interpolation in FIGS. 3A–D if we use the modified (transposed) texel values and the modified (complemented) values for sfrac and tfrac as indicated in the drawings: The resultant interpolated texel value is the same for each of the four texel quads and pixels. This is because, in each case, not only have we complemented the fractional parts of s and t in a particular way, but we have also transposed the locations of the four corner texels in a particular way.

A cost-effective memory arrangement and method will now be described that takes advantage of these observations in order to achieve memory read efficiencies for bilinear (and trilinear) interpolation in a texture mapping system.

Figure 4:
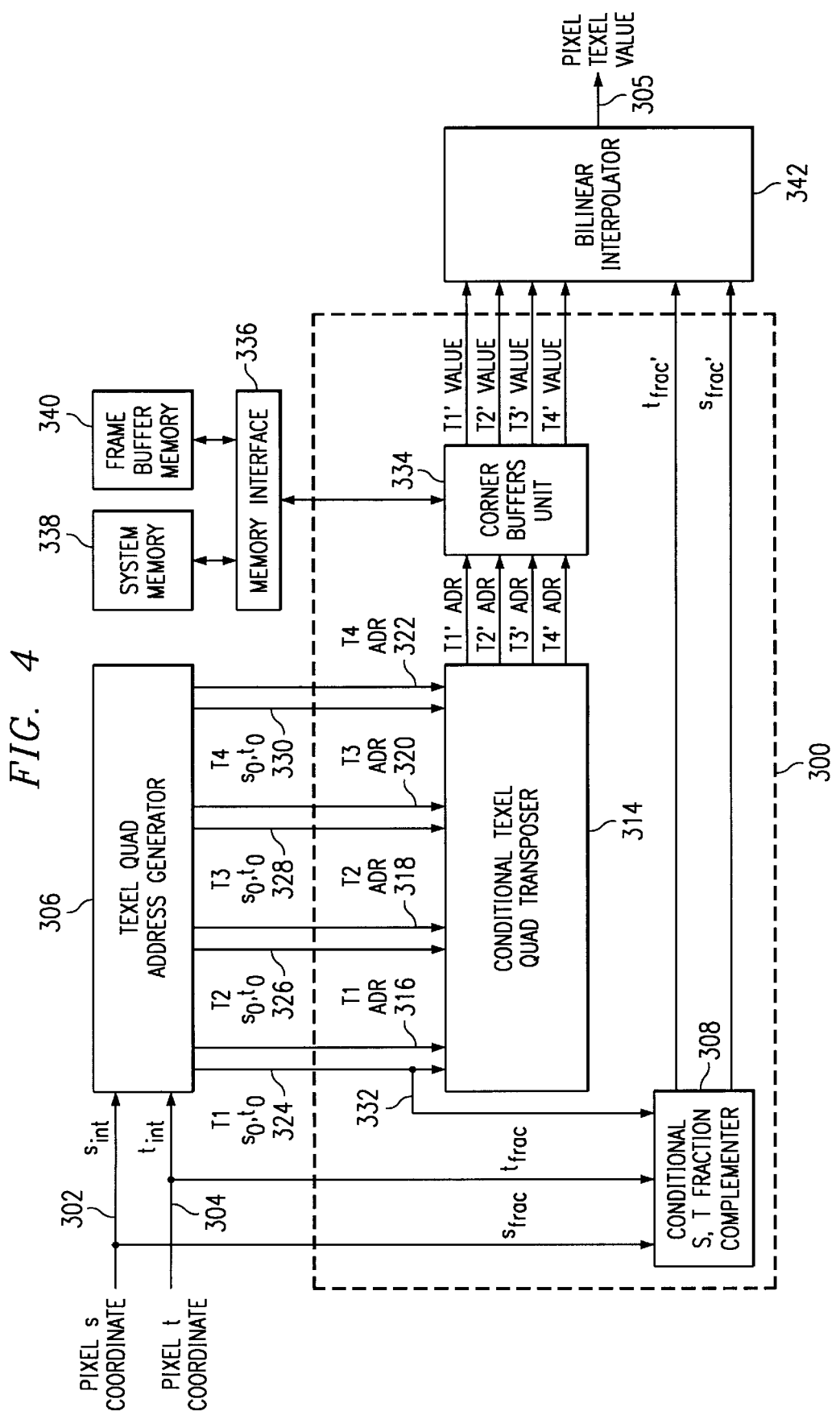
FIG. 4 is a block diagram illustrating part of a texture mapping system with a corner buffer system implemented therein according to a preferred embodiment of the invention.

FIG. 4 illustrates the pertinent parts of a conventional texture mapping system, except that a corner buffer system 300 according to a preferred embodiment of the invention is implemented therein. It is assumed for the purposes of FIG. 4 that conventional upstream hardware or software has already determined the s,t coordinates for a given pixel (hereinafter the "pixel s,t coordinates"), including the integer and fractional parts. Those pixel s,t coordinates are fed into the system of FIG. 4 at 302, 304; after processing by the system, the interpolated texel value for the pixel is output at 305.

The integer parts of the pixel s,t coordinates go to texel quad address generator 306, and the fractional parts go to conditional s,t fraction complementer 308, as shown. Texel quad address generator 306 may be conventional. Its primary job is to use the integer part of the pixel s,t coordinates to select which texel quad should be used in the bilinear interpolation process. Techniques for accomplishing this are known in the art. Once texel quad address generator 306 has done this, it outputs the memory addresses 316–322 and the s,t coordinates 324–330 for each of the four selected texels. Because texel quad address generator 306 is conventional, however, the s,t coordinates for T1 will always correspond to the upper left corner of the selected texel quad. The s,t coordinates for T2 will always correspond to the upper right corner of the selected texel quad. The s,t coordinates for T3 will always correspond to the lower left corner of the selected texel quad. And the s,t coordinates for T4 will always correspond to the lower right corner of the selected texel quad.

By way of example, assume an arbitrary pixel 200 whose s,t coordinates happen to map into the texel quad labeled H in FIG. 2. In such a case, the LSBs of the s,t coordinates for T1 coming out of texel quad address generator 306 at 324 would be 1,0. The LSBs of the s,t coordinates for T2 coming out at 326 would be 1,1. The LSBs of the s,t coordinates for T3 coming out at 328 would be 0,0. And the LSBs of the s,t coordinates for T4 coming out at 330 would be 0,1. Taking another example, assume another arbitrary pixel 216 whose s,t coordinates happen to map into texel quad O. In that case, the LSBs of the s,t coordinates for T1 coming out of texel quad address generator 306 at 324 would be 0,0. The LSBs of the s,t coordinates for T2 coming out at 326 would be 0,1. The LSBs of the s,t coordinates for T3 coming out at 328 would be 1,0. And the LSBs of the s,t coordinates for T4 coming out at 330 would be 1,1.

The addresses for each of T1–T4 are sent to conditional texel quad transposer 314 as shown at 316–322. In addition, the LSB of the s coordinate and the LSB of the t coordinate for each of T1–T4 are sent to conditional texel quad transposer 314 as shown at 324–330. Also, the LSB of the s coordinate and the LSB of the t coordinate for T1 are sent to conditional s,t fraction complementer 308 as shown at 332.

The function of conditional texel quad transposer 306 is to transpose (if necessary and as necessary) the incoming texel addresses so that the following result is accomplished: The address output at T1'ADR will always correspond to the texel whose s,t coordinate LSBs are 0,0. The address output at T2'ADR will always correspond to the texel whose s,t coordinate LSBs are 0,1. The address output at T3'ADR will always correspond to the texel whose s,t coordinate LSBs are 1,0. And the address output at T4'ADR will always correspond to the texel whose s,t coordinate LSB s are 1,1.

Figure 5:
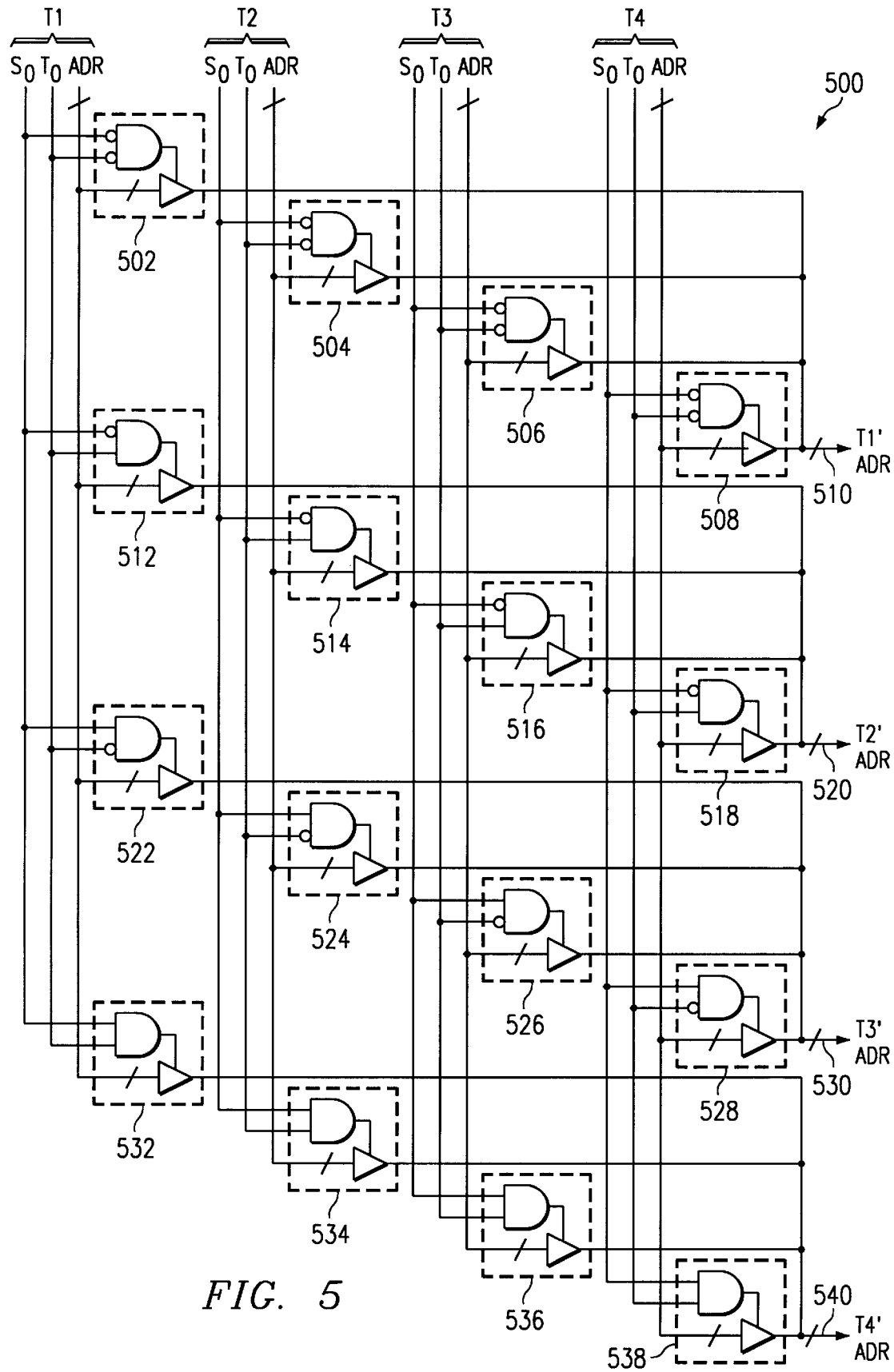
FIG. 5 is a schematic diagram illustrating a first embodiment of the conditional texel quad transposer of FIG. 4.

The LSBs of the s,t coordinates of one or more of T1–T4 may be used for this purpose. One way of implementing conditional texel quad transposer 306 is with a cross-bar switch matrix 500 as illustrated in FIG. 5. The LSBs of the s,t coordinates for T1–T4 as well as the addresses for T1–T4 are inputs at the top of the matrix, as shown. The outputs of the matrix, T1'ADR, T2'ADR, T3'ADR and T4'ADR are shown on the right at 510, 520, 530 and 540, respectively. Decoder/drivers 502–508 will select the texel address associated with an s,t coordinate pair of 0,0 and route it to T1'ADR output 510. Decoder/drivers 512–518 will select the texel address associated with an s,t coordinate pair of 0,1 and route it to T2'ADR output 520. Decoder/drivers 522–528 will select the texel address associated with an s,t coordinate pair of 1,0 and route it to T3'ADR output 530. And decoder/drivers 532–538 will select the texel address associated with an s,t coordinate pair of 1,1 and route it to T4'ADR output 540. Of course, the implementation shown in FIG. 5 is not the only way to accomplish the above-described conditional transposition of texel addresses.

Figure 8:
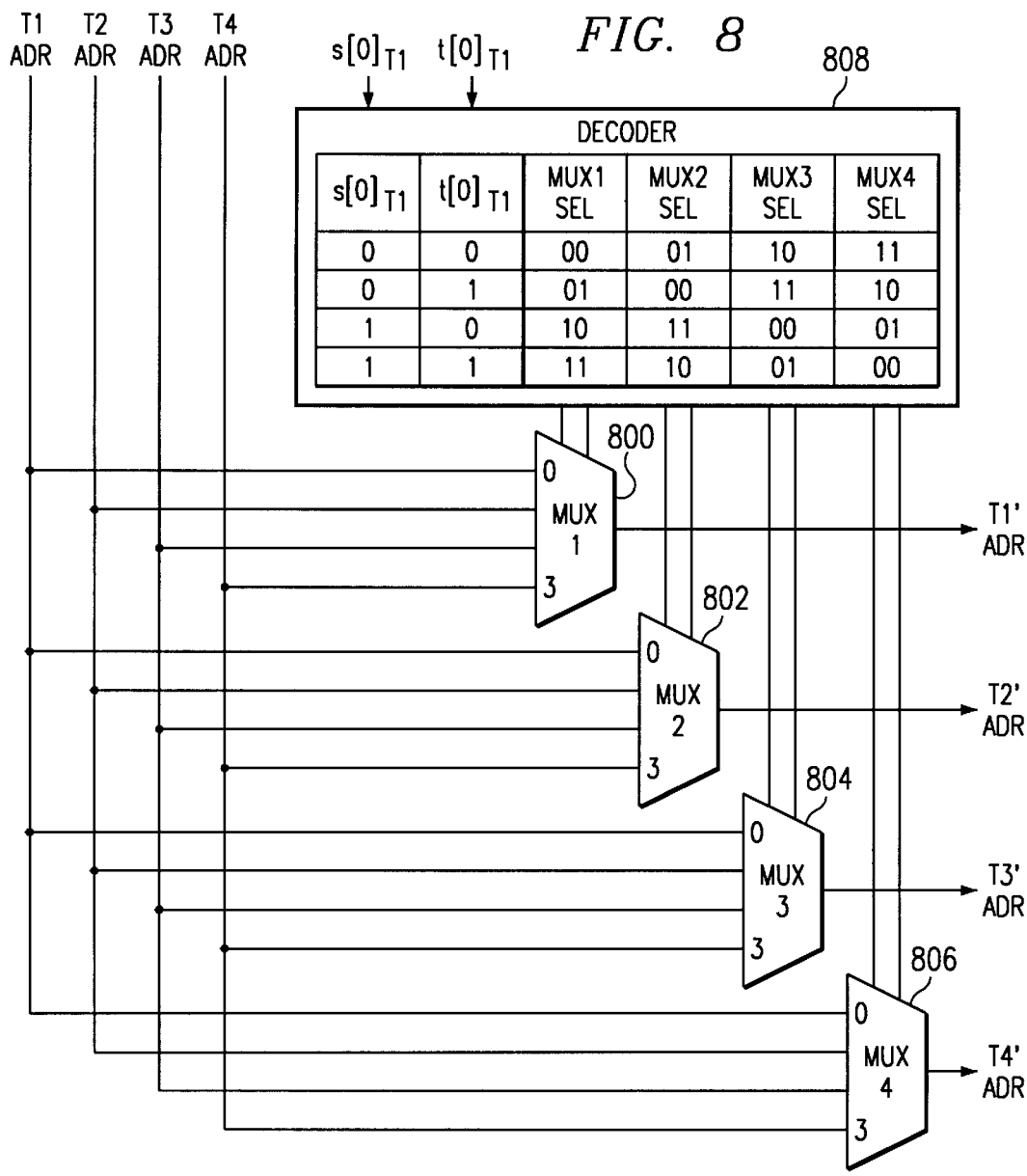
FIG. 8 is a block diagram illustrating a second embodiment of the conditional texel quad transposer of FIG. 4.

Alternate or more minimized implementations of this function may be preferable depending on design constraints and on the host system environment. For example, another way of implementing conditional texel quad transposer 306 is shown in FIG. 8. In the implementation of FIG. 8, use is made of the observation that the LSBs of the s,t coordinate of only one of the four texels in the texel quad are needed to determine which transposition must be performed (if any). This is true provided the designer knows to which corner of the texel quad the s,t coordinate LSBs correspond. The example shown in FIG. 8 demonstrates using the s,t coordinate LSBs for T1 (the upper left corner of the texel quad). As can be seen, all that is needed is four 4:1 multiplexers 800–806 and a decoder 808. The truth table for decoder 808 is shown in the drawing. Equivalent implementations (with different decoding) may be created using the s,t coordinate LSBs for texels other than T1.

The function of conditional s,t fraction complementer 308 is to use the LSBs of the s,t coordinates for T1 in order to complement (if necessary and as necessary) the incoming fractional parts of the pixel s,t coordinates in order to achieve the results described in Table 2 below:

TABLE 2

| T1 s coordinate LSB | T1 t coordinate LSB | sfrac' equals | tfrac' equals |
|---|---|---|---|
| 0 | 0 | sfrac | tfrac |
| 0 | 1 | sfrac | 1–tfrac |
| 1 | 0 | 1–sfrac | tfrac |
| 1 | 1 | 1–sfrac | 1–tfrac |

(Note that the LSBs for the s,t coordinates of any one of the four texels in the texel quad can be used to determine whether sfrac and tfrac should be complemented; the choice of the s,t coordinates for T1 in the illustrated embodiment was arbitrary.)

Figure 6:
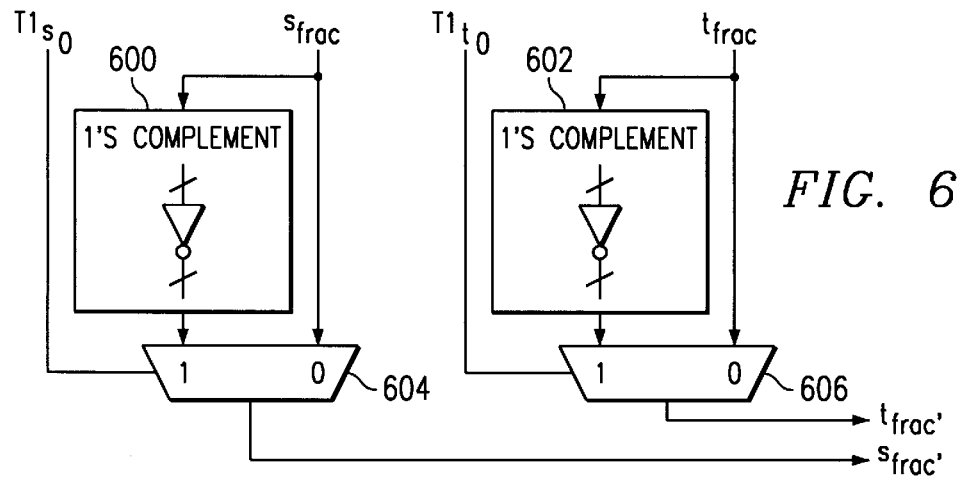
FIG. 6 is a schematic diagram illustrating an embodiment of the conditional s,t fraction complementer of FIG. 4.

One way of performing the function of s,t fraction complementer 308 is with a pair of 1's complement units 600, 602 and a pair of multiplexers 604, 606 as illustrated in FIG. 6. Because the inputs to 1's complement units 600 and 602 are fractions, the outputs of 1's complement units 600 and 602 represent the value 1-input. Although a more accurate arithmetic result would be achieved using 2's complement units in place of 1's complement units 600, 602, 1's complement units are easier to implement. (A 1's complement unit simply inverts each of the input bits.) Moreover, the arithmetic result given by 1's complement units are fairly accurate for calculating the result of one minus a fraction.

Figure 7:
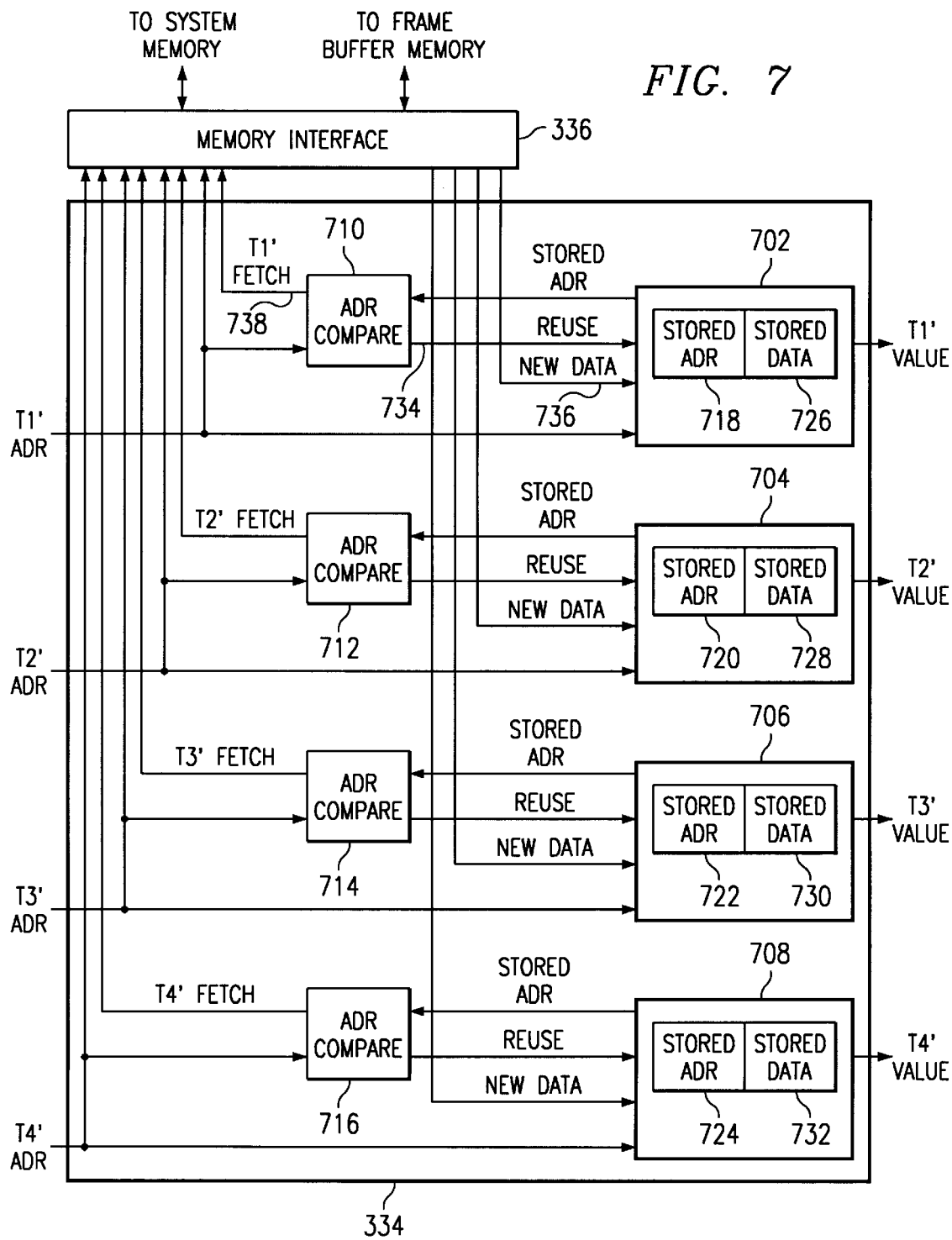
FIG. 7 is a block diagram illustrating an embodiment of the corner buffers unit of FIG. 4 as well as its data paths to and from the memory interface of FIG. 4.

The function of corner buffers unit 334 will now be described with reference to FIG. 7. Within corner buffers unit 334 are four corner buffers 702–708 and four address compare units 710–716. Each of the four corner buffers 702–708 stores at least one address 718–724 and at least one data word 726–732. It should be noted that blocks 702–708 shown in the drawing are not intended to place limits on where in the machine the address values 718–724 may be stored. In alternative embodiments, those addresses may be stored elsewhere (in texel quad address generator 306, for example) as long as a correspondence is maintained between the stored addresses and the stored data words 726–732.

Address compare units 710–716 will be described hereinbelow in terms of the functionality of address compare unit 710; once this functionality is disclosed, persons having skill in the art will be able to implement address compare units 710–716 716 using well-known techniques. Moreover, all of address compare units 710–716 behave in an identical manner. From the structure disclosed in the drawing, it can be seen that address compare unit 710 receives a new texel address T1'ADR at one input and stored address 718 at another input. Address compare unit 710 determines whether the two addresses are the same. If they are, address compare unit 710 asserts reuse signal 734. If this signal is asserted, corner buffer 702 will know that stored data word 726 contains the texel data to be used for T1'VALUE during the next interpolation. Therefore, if reuse signal 734 is asserted, corner buffer 702 will not attempt to load new data from new data input 736. On the other hand, if address compare unit 710 determines that the two addresses are not the same, then it asserts T1'FETCH signal 738 to memory interface 336. In response, memory interface 336 uses the new T1'ADR to retrieve the corresponding data word from system memory 338 or frame buffer memory 340. Also, corner buffer 702 will know to latch the new data into stored data word 726 from new data input 736, because reuse signal 734 will not have been asserted. Determining proper timing and control signals for implementing this process are well within the skills of persons working in this art and are not particularly germane to the invention; therefore, they will not be discussed herein in any further detail. Likewise, persons having skill in the art and having reference to this functional description will be able to implement a memory interface 336 suitable for interacting with corner buffers 334 in the manner just described. The implementation details of memory interface 336 will not be described here because they depend almost entirely on the design of the host system, and especially on the design of system memory 338 and frame buffer memory 340, which are not a part of the invention.

Bilinear interpolator 342 may also be conventional, and should generally implement the bilinear interpolation process described in detail above. Bilinear interpolator 342 should perform an interpolation using T1'VALUE, T2'VALUE, T3'VALUE, T4'VALUE, sfrac' and tfrac' as inputs, and should present the resultant interpolated texel value at output 305. Bilinear interpolation unit 342 should always interpret the T1' input as the upper left corner of the texel quad, the T2' input as the upper right corner, the T3' value as the lower left corner, and the T4' value as the lower right corner.

EXAMPLES OF EFFICIENCIES ACHEIVED BY THE INVENTION

To appreciate the efficiencies achieved by the invention, assume that a bilinear interpolation has just been performed for pixel 200 in texel quad H of FIG. 2. If so, then the texel value corresponding to corner 202 will currently be stored in corner buffer 706. The texel value corresponding to corner 204 will currently be stored in corner buffer 708. The texel value corresponding to corner 206 will currently be stored in corner buffer 702. And the texel value corresponding to corner 208 will currently be stored in corner buffer 704.

Assume now that the next pixel presented for interpolation is pixel 210, which maps into texel quad I. From an efficiency standpoint it can be seen that, at most, the only data that ought to be retrieved from system memory 338 or frame buffer memory 340 to perform the interpolation for pixel 210 are the texel values for corners 212 and 214. (As will be discussed below in the context of further embodiments, even these texel values might not have to be newly retrieved from memory.) The system and method of the invention determines this automatically and with a minimum number of compares: When the s,t coordinates for pixel 210 are fed into the system at 302, 304, texel quad address generator 306 will present the addresses for corners 204 and 208 as T1ADR and T3ADR, respectively. And texel quad address generator 306 will present the addresses for corners 212 and 214 as T2ADR and T4ADR, respectively. But, based on the LSBs of the s,t coordinates for the texels in texel quad I, conditional texel quad transposer 314 will transpose the rows and columns of texel quad I so that the addresses for corners 204 and 208 will be presented to corner buffers unit 334 as T4'ADR and T2'ADR, respectively. And the addresses for corners 212 and 214 will be presented to corner buffers unit 334 as T3'ADR and T1'ADR, respectively. Because the T2'ADR input corresponds to corner buffer 704 and the T4'ADR input corresponds to corner buffer 708, address compare units 712 and 716 will immediately recognize that no new data need be requested from system or frame buffer memory for corners 204 and 208 of texel quad I. Only address compare units 710 and 714 will request new data.

Assume the next pixel presented for interpolation is pixel 216, which maps into texel quad O. Although the texel values for new corners 218, 220 and 22 may have to be read from system or frame buffer memory, the system and method of the invention will determine that the value for corner 214 will not have to be read from system or frame buffer memory: When pixel 210 was being processed, the texel value for corner 214 was stored in corner buffer 702 because the LSBs of its s,t coordinates are 0,0. When pixel 216 is presented for processing, the address for the texel value at corner 214 will be presented to corner buffers unit 334 as T1'ADR. Therefore, address compare unit 710 will discover that the old and new addresses match, and it will not request a second fetch from memory interface 336 for corner 214.

Assume the next pixel presented for interpolation is pixel 224, which also maps to texel quad O (the same texel quad as the previous pixel). In this case, all four corners of corner buffers unit 334 will recognize hits, and no texel data will be read from system of frame buffer memory.

In the cases of all three pixels 210, 216, and 224, the sfrac and tfrac values would have been complemented appropriately before the interpolations were performed, of course, in accordance with the method described above.

FURTHER EMBODIMENTS

While the invention has been described in relation to a preferred embodiment thereof, the described embodiment has been presented by way of example and not by way of limitation. It will be understood by those skilled in the art that various changes may be made in the form and details of the described embodiment resulting in equivalent embodiments that will remain within the scope of the appended claims.

For example, additional efficiencies may be obtained by adding more than one line of storage to each of corner units 702–708. Indeed, a mini-cache may be implemented in each corner unit.

Also, recall from the above discussion that one data word may contain more than one texel value. Because this is so, it is possible that two or more corner buffers may require the same data word in the process of performing bilinear interpolation for a given pixel. To take advantage of this fact, additional compare units may be added to corner buffers unit 334 to determine whether any of T1'ADR, T2'ADR, T3'ADR or T4'ADR are equal. The ideal locations of the additional comparators will depend, of course, on how the texel values are organized in system and frame buffer memory. Assume it is determined by such additional compare units that T1'ADR is equal to T2'ADR, and assume further that the texel value corresponding to T2'ADR is already resident in corner buffer 702. In that case, rather than request a fetch from system memory or frame buffer memory for the texel value corresponding to T2'ADR, the data stored in corner buffer 702 may simply be copied into corner buffer 704. For cases in which a common texel (data word) address is detected but in which the required data word is not currently resident in any of corner buffers 702–708, the additional compare will still have been worthwhile because it will have informed corner buffers unit 334 that only one fetch request need be generated in order to the retrieve the required common data word.

What is claimed is:

1. A conditional texel quad transposer, comprising: first, second, third and fourth texel address inputs for receiving first, second, third and fourth texel addresses, respectively;

first, second, third and fourth texel address outputs; and conditional transposer circuitry operable to route said first, second, third and fourth texel addresses to said first, second, third and fourth outputs in such a manner that: the texel address appearing at said first output corresponds to the texel for which the LSBs of the s and t coordinates are 0 and 0, respectively; the texel address appearing at said second output corresponds to the texel for which the LSBs of the s and t coordinates are 0 and 1, respectively; the texel address appearing at said third output corresponds to the texel for which the LSBs of the s and t coordinates are 1 and 0, respectively; and the texel address appearing at said fourth output corresponds to the texel for which the LSBs of the s and t coordinates are 1 and 1, respectively.

2. A conditional s,t fraction complementer, comprising:

an sfrac input for receiving the fractional part of the s coordinate corresponding to a pixel;

a tfrac input for receiving the fractional part of the t coordinate corresponding to a pixel;

an s,t input for receiving the LSBs of the s and t coordinates of at least one of the four texels defining a texel quad corresponding to said pixel;

an sfrac' output; and a tfrac' output;

wherein said conditional s,t fraction complementer is operable to produce an sfrac' value at said sfrac' output and a tfrac' value at said tfrac' output responsive to said sfrac input, said tfrac input and said s,t input, wherein said sfrac' value is chosen from the group consisting of sfrac and an approximation to the quantity (1-sfrac), and wherein said tfrac' value is chosen from the group consisting of tfrac and an approximation to the quantity (1-tfrac).

3. A corner buffer unit, comprising:

first, second, third and fourth texel address inputs;

first, second, third and fourth texel value outputs;

first, second, third and fourth address storage registers associated with first, second, third and fourth data storage registers, respectively; and first, second, third and fourth comparator units coupled to said first, second, third and fourth texel address inputs, respectively, to said first, second, third and fourth address storage registers, respectively, and to a memory interface, and operable with said memory interface to cause texel data corresponding to the address appearing on at least one of said first, second, third and fourth texel address inputs to be loaded into at least one of said first, second, third and fourth data storage registers if the address appearing at said at least one of said first, second, third and fourth texel address inputs does not match the address stored in the address storage register associated with said at least one of said first, second, third and fourth data storage registers.

4. A corner buffer system for improving memory read efficiency during the process of driving a bilinear interpolation unit to produce a texel value corresponding to a pixel, said corner buffer system comprising:

conditional texel quad transposer circuitry operable to receive first, second, third and fourth texel addresses at first, second, third and fourth texel address inputs, respectively, said first, second, third and fourth texel addresses corresponding to four texels that define a texel quad to which said pixel maps, and operable to route said first, second, third and fourth texel addresses to first, second, third and fourth outputs in such a manner that: the texel address appearing at said first output corresponds to the texel for which the LSBs of the s and t coordinates are 0 and 0, respectively; the texel address appearing at said second output corresponds to the texel for which the LSBs of the s and t coordinates are 0 and 1, respectively; the texel address appearing at said third output corresponds to the texel for which the LSBs of the s and t coordinates are 1 and 0, respectively; and the texel address appearing at said fourth output corresponds to the texel for which the LSBs of the s and t coordinates are 1 and 1, respectively;

conditional s,t fraction complementer circuitry operable to receive the fractional part of the s coordinate for said pixel at an sfrac input, the fractional part of the t coordinate for said pixel at a tfrac input, and the LSBs of the s and t coordinates of at least one of said four texels at an s,t input, and operable to produce an sfrac' value at an sfrac' output and a tfrac' value at a tfrac' output responsive to said sfrac input, said tfrac input and said s,t input, wherein said sfrac' value is chosen from the group consisting of sfrac and an approximation to the quantity (1-sfrac), and wherein said tfrac' value is chosen from the group consisting of tfrac and an approximation to the quantity (1-tfrac);

first, second, third and fourth address storage registers associated with first, second, third and fourth data storage registers, respectively; and first, second, third and fourth comparator units coupled to said first, second, third and fourth outputs, respectively, to said first, second, third and fourth address storage registers, respectively, and to a memory interface, and operable with said memory interface to cause texel data corresponding to the address appearing on at least one of said first, second, third and fourth outputs to be loaded into at least one of said first, second, third and fourth data storage registers if the address appearing at said at least one of said first, second, third and fourth outputs does not match the address stored in the address storage register associated with said at least one of said first, second, third and fourth data storage registers;

wherein said sfrac' output, said tfrac' output and the outputs of said first, second, third and fourth data storage registers are operable to be coupled to corresponding inputs of said bilinear interpolation unit.

* * * * *